(12) United States Patent
Wang

(10) Patent No.: US 7,950,686 B2
(45) Date of Patent: May 31, 2011

(54) REDUCIBLE CHASSIS OF A MAN-CARRYING VEHICLE

(75) Inventor: Arthur Wang, Kang Shan Town (TW)

(73) Assignee: Freerider Corp., Kaohsiung County (TW)

( * ) Notice: Subject to any disclaimer, the term of this patent is extended or adjusted under 35 U.S.C. 154(b) by 262 days.

(21) Appl. No.: 12/314,721

(22) Filed: Dec. 16, 2008

(65) Prior Publication Data

US 2010/0148474 A1   Jun. 17, 2010

(51) Int. Cl.
  *B62B 7/06*   (2006.01)
  *B62B 3/02*   (2006.01)
  *B60D 1/54*   (2006.01)
  *B62K 13/08*   (2006.01)
  *B66F 3/22*   (2006.01)

(52) U.S. Cl. ............... 280/643; 280/491.4; 280/648; 180/209; 254/124

(58) Field of Classification Search .......... 280/642, 280/643, 647, 648, 650, 657, 658, 47.18, 280/47.34, 47.38, 47.41, 491.1, 491.4; 180/209; 254/122, 124, 126
See application file for complete search history.

(56) References Cited

U.S. PATENT DOCUMENTS

| 711,247 | A | * | 10/1902 | Evans | 280/643 |
| 2,501,001 | A | * | 3/1950 | Neely | 254/122 |
| 4,116,460 | A | * | 9/1978 | Drower | 280/478.1 |
| 6,530,445 | B1 | * | 3/2003 | Flowers et al. | 180/208 |
| 6,601,826 | B1 | * | 8/2003 | Granata | 254/122 |
| 7,221,123 | B2 | * | 5/2007 | Chen | 320/104 |
| 2005/0017469 | A1 | * | 1/2005 | Hill et al. | 280/47.38 |
| 2005/0067206 | A1 | * | 3/2005 | Trautman et al. | 180/209 |

* cited by examiner

*Primary Examiner* — J. Allen Shriver, II
*Assistant Examiner* — John R Olszewski
(74) *Attorney, Agent, or Firm* — Rosenberg, Klein & Lee

(57) ABSTRACT

A man-carrying vehicle has a chassis, which can be reduced for the vehicle to be easy to store, put away and transport; the chassis includes a front part, a rear part, and a stretching and reducing device interposed between the front and the rear parts; the stretching and reducing device includes first and second stationary components, first and second crank and connecting rod combinations, and a stretching and reducing assistant unit; the first and the second stationary components are fixedly joined on the front and the rear parts respectively; the crank and connecting rod combinations are interposed between and pivoted to the stationary components; the stretching and reducing assistant unit is interposed between and pivoted on one of the stationary components and one of the crank and connecting rod combinations to provide power to change position of the front part in relation to the rear part of the chassis.

6 Claims, 4 Drawing Sheets

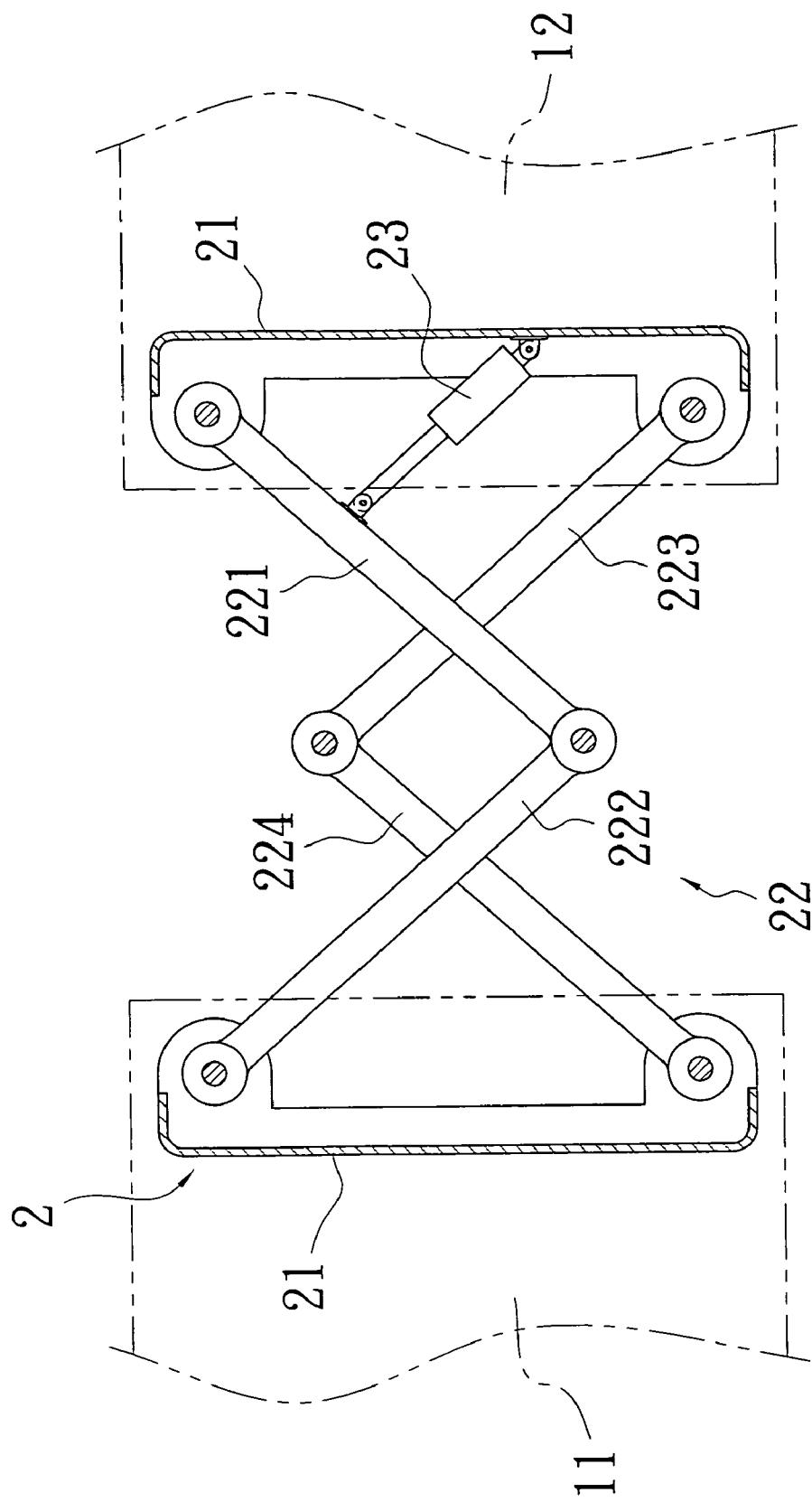

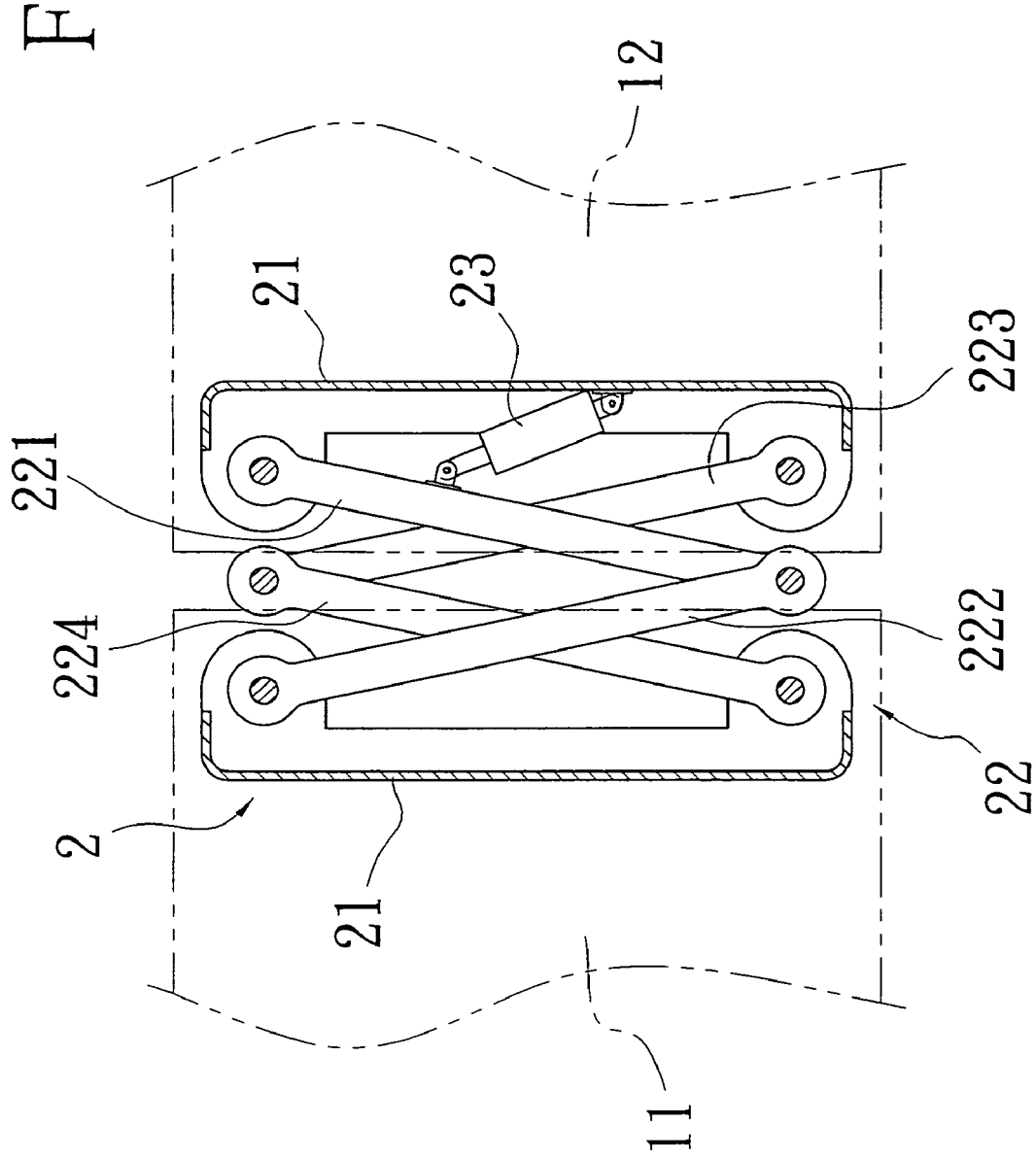

REDUCIBLE CHASSIS OF A MAN-CARRYING VEHICLE

BACKGROUND OF THE INVENTION

1. Field of the Invention

The present invention relates to a reducible chassis of a man-carrying vehicle, more particularly one, which can be shortened for allowing the vehicle to be easy to convey, store, put away and transport.

2. Brief Description of the Prior Art

Wheelchairs used to be popular vehicles for the elderly, and those people who suffer from leg injury, paralysis of lower half parts of bodies, serious sicknesses etc. However, conventional wheelchairs are manual instead of being electricity-powered; in order to move the wheelchairs, either the riders have to use their hands to rotate the wheels or the carriers have to push the wheelchairs. Therefore, conventional wheelchairs can only move at a relatively low speed, and isn't convenient to use.

Currently, man-carrying vehicles such as electric walk-substituting carts and electric wheelchairs are getting more popular than conventional wheelchairs, which are used with the elderly, and those people who suffer from leg injury, paralysis of lower half parts of bodies, serious sicknesses etc. However, such man-carrying vehicles can't be folded or reduced in size. Consequently, they will occupy relatively much space, and difficult to convey, put away, store and transport when they aren't in use. Therefore, there is still room for improvement.

SUMMARY OF THE INVENTION

It is a main object of the present invention to provide an improvement on a man-carrying vehicle to overcome the above problems.

A man-carrying vehicle in accordance with an embodiment of the present invention has a chassis, which can be moved between a stretched in-use position and a reduced not-in-use one. The chassis includes a front part, a rear part, and a stretching and reducing device interposed between the front and the rear parts. The stretching and reducing device includes first and second stationary components, first and second crank and connecting rod combinations, and a stretching and reducing assistant unit. The first and the second stationary components are fixedly joined on the front and the rear parts respectively. The crank and connecting rod combinations are interposed between and pivoted to the stationary components. The stretching and reducing assistant unit is interposed between and pivoted on one of the stationary components and one of the crank and connecting rod combinations to provide power to change position of the front part in relation to the rear part of the chassis; therefore, the vehicle can be reduced to be easy to store, put away and transport when the stretching and reducing assistant unit is activated.

BRIEF DESCRIPTION OF THE DRAWINGS

The present invention will be better understood by referring to the accompanying drawings, wherein:

FIG. 3 is a partial top view of the present invention, taken when the stretching and reducing device is in the stretching position, and FIG. 4 is a partial top view of the present invention, taken when the stretching and reducing device is in the reducing position.

DETAILED DESCRIPTION OF THE PREFERRED EMBODIMENTS

Figure 1:
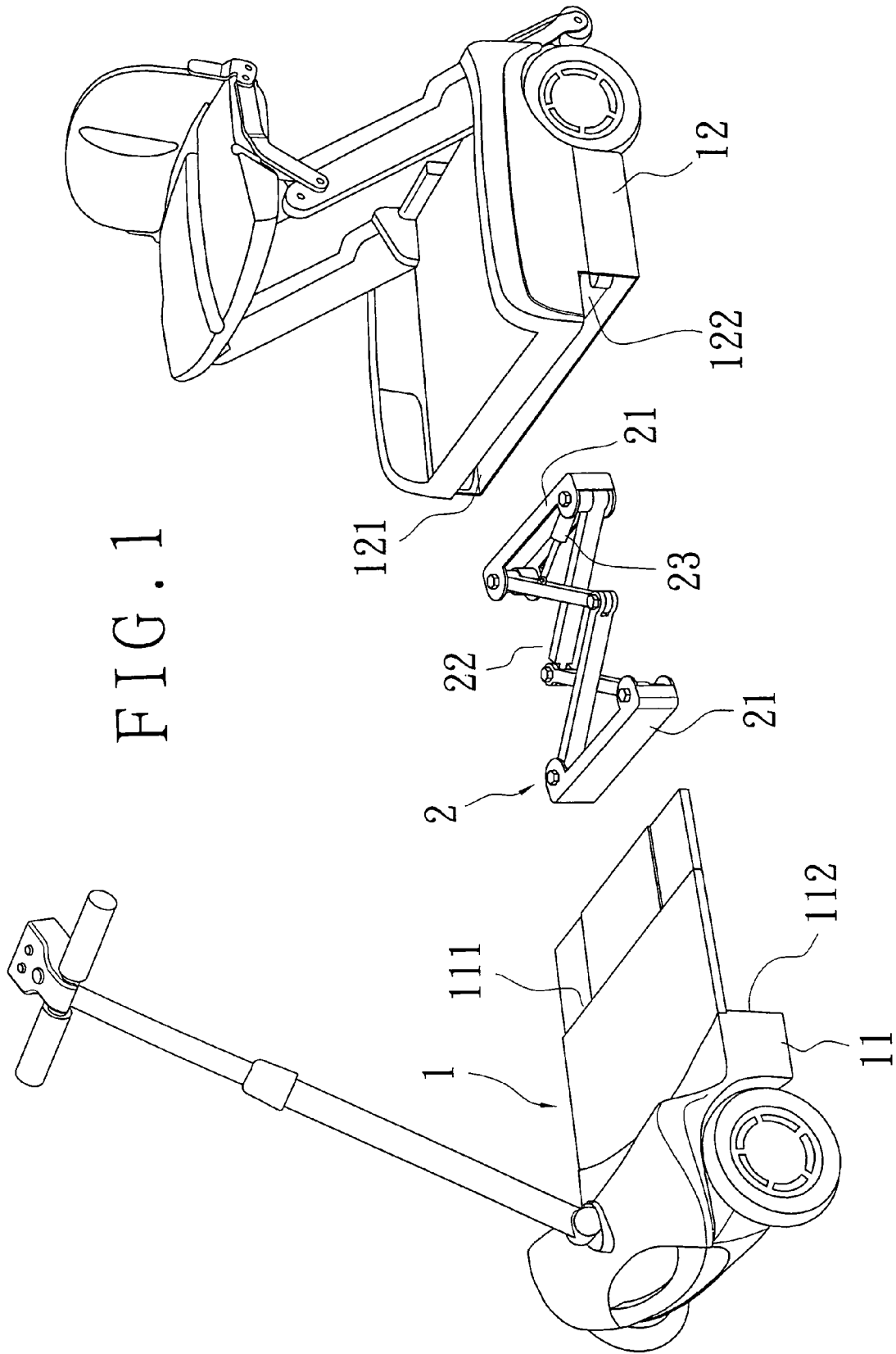
FIG. 1 is an exploded perspective view of the present invention.
Figure 2:
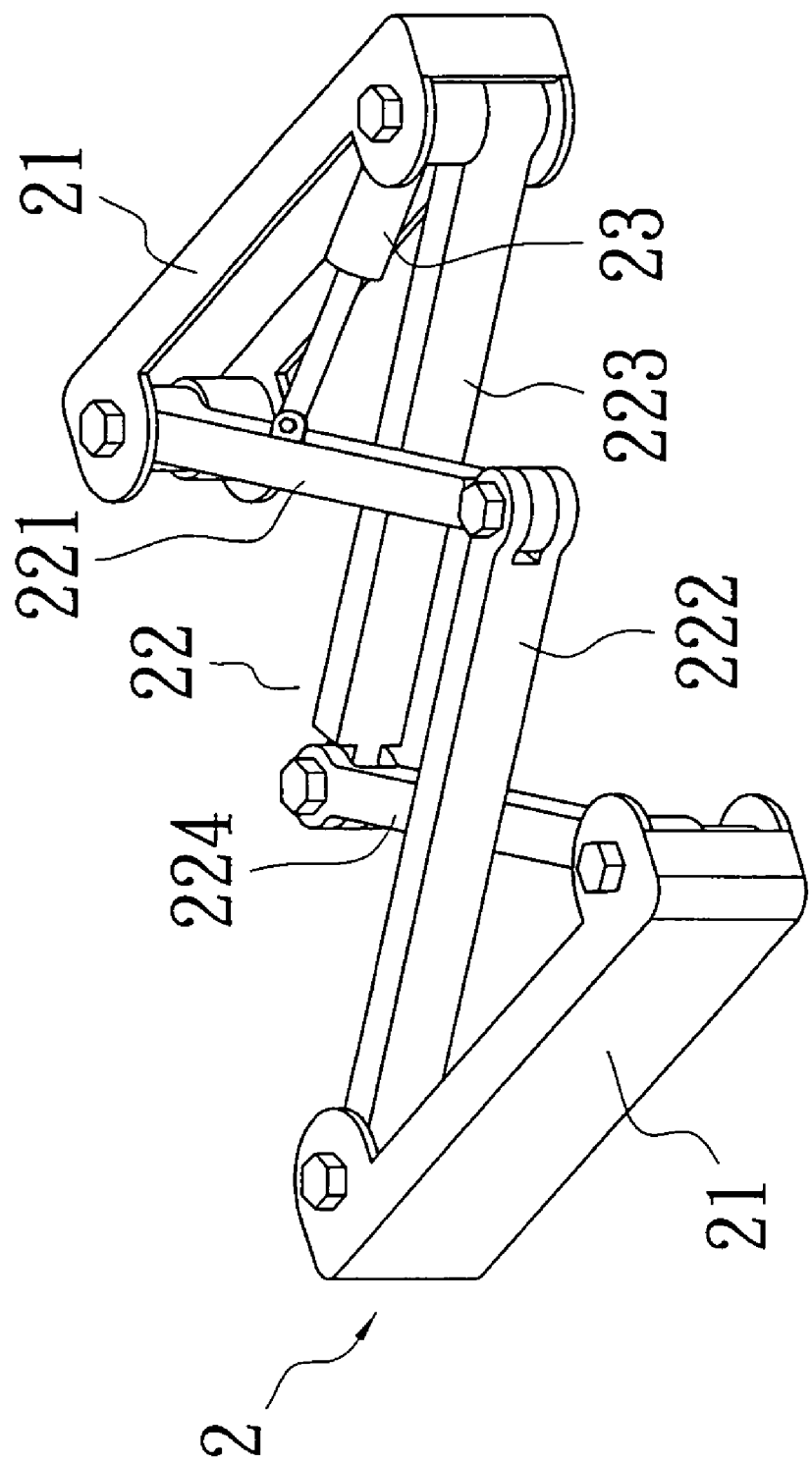
FIG. 2 is a perspective view of the stretching and reducing device of the present invention.

Referring to FIG. 1, a preferred embodiment of a man-carrying vehicle of the present invention has a chassis 1, which consists of a front part 11, a rear part 12, and a stretching and reducing device 2.

The front part 11 of the chassis 1 has a footrest board 111, and a joining part 112 on a lower side of the footrest board 111.

The rear part 12 of the chassis 1 has a hollow holding portion 121, which is provided to receive the footrest board 111 of the front part 11. The rear part 12 further has a joining part 122 on a lower side of the hollow holding portion 121.

The stretching and reducing device 2 consists of first and second stationary components 21, and first and second crank and connecting rod combinations 22. The first and the second stationary components 21 are fixedly joined on the front and the rear joining parts 112 and 122 respectively, in a transverse position in relation to the chassis 1, and the chassis 1 has a first lateral (right) side, and a second lateral (left) side. The first crank and connecting rod combination 22 includes a first crank 221 and a first connecting rod 222. The second crank and connecting rod combination 22 includes a second crank 223 and a second connecting rod 224.

The first connecting rod 222 is pivoted at a front end thereof to the first stationary component 21. The first crank 221 is pivoted at a front end thereof to a rear end of the first connecting rod 222, and pivoted at a rear end to the second stationary component 21; a pivotal joint between the first connecting rod 222 and the first stationary component 21 is nearer to the first lateral side of the chassis 1 than a pivotal joint between the first connecting rod 222 and the first crank 221; a pivotal joint between the first crank 221 and the second stationary component 21 is nearer to the first lateral side of the chassis 1 than the pivotal joint between the first connecting rod 222 and the first crank 221.

The second connecting rod 224 is pivoted at a front end thereof to the first stationary component 21. The second crank 223 is pivoted at a front end thereof to a rear end of the second connecting rod 224, and pivoted at a rear end thereof to the second stationary component 21; a pivotal joint between the second connecting rod 224 and the first stationary component 21 is nearer to the second lateral side of the chassis 1 than a pivotal joint between the second connecting rod 224 and the second crank 223; a pivotal joint between the second crank 223 and the second stationary component 21 is nearer to the second lateral side of the chassis 1 than the pivotal joint between the second connecting rod 224 and the second crank 223.

Moreover, the pivotal joint between the first connecting rod 222 and the first crank 221 is nearer to the second lateral side of the chassis than the pivotal joint between the second connecting rod 224 and the second crank 223. And, the first connecting rod 222 is above and crosses the second connecting rod 224 while the first crank 221 is above and crosses the second crank 223.

Furthermore, a stretching and reducing assistant unit 23 is pivoted to one of the crank and connecting rod combinations 22 as well as one of the stationary components 21; the stretching and reducing assistant unit 23 can be an electric screw cylinder.

Referring to FIG. 1 and FIG. 3, the stretching and reducing assistant unit 23 can be activated to move the crank and connecting rod combinations 22 so as to move the front part 11 away from the rear part 12 of the chassis 1; thus, the chassis 1 of the man-carrying vehicle is stretched to an in-use position, wherein the footrest board 111 of the front part 11 is outside the hollow holding portion 121 of the rear part 12 for a rider to put his/her feet on.

Referring to FIG. 1 and FIG. 4, the stretching and reducing assistant unit 23 can be activated to move the crank and connecting rod combinations 22 so as to make the front part 11 move closer to the rear part 12 of the chassis 1; thus, the footrest board 111 of the front part 11 is received in the hollow holding portion 121 of the rear part 12, and the chassis 1 is in a reduced not-in-use position for allowing the man-carrying vehicle to be easy to convey, store, put away and transport.

Moreover, the stretching and reducing assistant unit 23 can be an air cylinder, which is interposed between one of the crank and connecting rod combinations 22 as well as one of the stationary component 21; the air cylinder will serve as a buffer to prevent the user's improper application of force from causing damage to the stretching and reducing device 2 and the front and the rear parts 11 and 12 of the chassis 1 when the user is manually moving the front and the rear parts 11 and 12 to stretch/reduce the chassis 1.

From the above description, it can be seen that the present invention has the following advantages:

1. The chassis of the present invention is equipped with a stretching and reducing device between its front and rear parts; the device includes cranks, connecting rods and stretching and reducing assistant unit, which are pivoted together. Therefore, the chassis can be easily stretched to an in-use position, and can be reduced for allowing the man-carrying vehicle to be easy to convey, store, put away and transport.

2. The stretching and reducing assistant unit of the stretching and reducing device can be an electric screw cylinder, which can apply force to save the labor of the user when the user is stretching or reducing the chassis.

3. The stretching and reducing assistant unit of the stretching and reducing device can be an air cylinder, which will serve as a buffer to prevent the user's improper application of force from causing damage to the stretching and reducing device and the front and the rear parts and of the chassis when the user is manually moving the front and the rear parts to stretch or reduce the chassis.

What is claimed is:

1. A reducible chassis of a man-carrying vehicle, comprising:
   a front part;
   a rear part; and
   a stretching and reducing device joined between the front and the rear parts; the stretching and reducing device including:
      (a) first and second stationary components fixedly joined on the front and the rear parts of the chassis respectively;
      (b) first and second crank and connecting rod combinations interposed between and pivoted to the first and the second stationary components; the crank and connecting rod combinations being positioned one above other; the crank and connecting rod combinations crossing each other in a separately displaceable manner one relative to the other; and
      (c) a stretching and reducing assistant unit interposed between and pivoted on one of the stationary components and one of the crank and connecting rod combinations.

2. The reducible chassis of a man-carrying vehicle as claimed in claim 1, wherein the front part of the chassis has a footrest board, and the rear part of the chassis has a hollow holding portion to receive the footrest board;
   the footrest board having a first joining part on a lower side thereof; the first stationary component of the stretching and reducing device being fixedly joined on the first joining part;
   the hollow holding portion having a second joining part on a lower side thereof; the second stationary component of the stretching and reducing device being fixedly joined on the second joining part.

3. The reducible chassis of a man-carrying vehicle as claimed in claim 1, wherein the first crank and connecting rod combination includes a first crank and a first connecting rod while the second crank and connecting rod combination includes a second crank and a second connecting rod;
   the first connecting rod being pivoted at a first end thereof to the first stationary component; the first crank being pivoted at a first end thereof to a second end of the first connecting rod; the first crank being pivoted at a second end thereof to the second stationary component; a pivotal joint between the first connecting rod and the first stationary component being nearer to a first lateral side of the chassis than a pivotal joint between the first connecting rod and the first crank; a pivotal joint between the first crank and the second stationary component being nearer to the first lateral side of the chassis than a pivotal joint between the first connecting rod and the first crank;
   the second connecting rod being pivoted at a first end thereof to the first stationary component; the second crank being pivoted at a first end thereof to a second end of the second connecting rod; the second crank being pivoted at a second end thereof to the second stationary component;
   a pivotal joint between the second connecting rod and the first stationary component being nearer to a second lateral side of the chassis than a pivotal joint between the second connecting rod and the second crank; a pivotal joint between the second crank and the second stationary component being nearer to the second lateral side of the chassis than a pivotal joint between the second connecting rod and the second crank;
   the pivotal joint between the second connecting rod and the second crank being nearer to the first lateral side of the chassis than the pivotal joint between the first connecting rod and the first crank;
   the first connecting rod being above and crossing the second connecting rod; the first crank being above and crossing the second crank.

4. The reducible chassis of a man-carrying vehicle as claimed in claim 1, wherein the stretching and reducing assistant unit is an electric screw cylinder.

5. The reducible chassis of a man-carrying vehicle as claimed in claim 1, wherein the stretching and reducing assistant unit is an air cylinder.

6. The reducible chassis of a man-carrying vehicle as claimed in claim 1, wherein one of the front and rear parts is slidably engaged to the other, the front and rear parts capturing the stretching and reducing device therebetween.

* * * * *